US009092224B2

(12) United States Patent
Bartlow et al.

(10) Patent No.: US 9,092,224 B2
(45) Date of Patent: Jul. 28, 2015

(54) METHOD AND SYSTEM TO AUTOMATICALLY ENFORCE A HYBRID BRANCHING STRATEGY

(71) Applicant: Nobilis, Inc., Falls Church, VA (US)

(72) Inventors: Nicholas Bartlow, Morgantown, WV (US); Zachary Hutzell, Morgantown, WV (US)

(73) Assignee: NOBLIS, INC., Falls Church, VA (US)

( * ) Notice: Subject to any disclaimer, the term of this patent is extended or adjusted under 35 U.S.C. 154(b) by 151 days.

(21) Appl. No.: 13/894,190

(22) Filed: May 14, 2013

(65) Prior Publication Data

US 2014/0344557 A1 Nov. 20, 2014

(51) Int. Cl.
*G06F 9/44* (2006.01)
*G06F 9/38* (2006.01)
*G05B 19/042* (2006.01)

(52) U.S. Cl.
CPC ............. *G06F 9/38* (2013.01); *G05B 19/0426* (2013.01); *G06F 8/71* (2013.01)

(58) Field of Classification Search
CPC .......... G06F 9/38; G06F 8/71; G05B 19/0426
See application file for complete search history.

(56) References Cited

U.S. PATENT DOCUMENTS

| 8,229,579 | B2 * | 7/2012 | Eldridge et al. | 700/31 |
|---|---|---|---|---|
| 8,365,140 | B2 * | 1/2013 | Heyhoe et al. | 717/106 |
| 8,429,630 | B2 * | 4/2013 | Nickolov et al. | 717/148 |
| 8,495,564 | B2 * | 7/2013 | Martineau | 717/106 |
| 8,601,440 | B2 * | 12/2013 | Massey et al. | 717/122 |
| 8,826,222 | B2 * | 9/2014 | Bak et al. | 717/101 |
| 2004/0230964 | A1 * | 11/2004 | Waugh et al. | 717/168 |
| 2009/0132996 | A1 * | 5/2009 | Eldridge et al. | 717/108 |
| 2014/0181789 | A1 * | 6/2014 | Canter et al. | 717/113 |

OTHER PUBLICATIONS

Guimaraes et al., Improving early detection of software merge conflicts, Jun. 2012, 11 pages.*
McGrath et al., Branch-explore-merge: facilitating real-time revision control in collaborative visual exploration, Nov. 2012, 10 pages.*
Phillips et al., Branching and merging: an investigation into current version control practices, May 2011, 7 pages.*
Atwood, Jeff, "Coding Horror: Software Branching and Parallel Universes", Oct. 2, 2007, 41 pages.
"Revision Control", Wikipedia article retrieved from http://en.wikipedia.org/wiki/Revision_control, Apr. 2, 2011, 6 pages.

* cited by examiner

*Primary Examiner* — Thuy Dao
(74) *Attorney, Agent, or Firm* — Brake Hughes Bellermann LLP

(57) ABSTRACT

A method and system for automatically enforcing a hybrid branching strategy include receiving a changeset designated for a branch. In response to receiving the changeset, the system may automatically determine whether a merge conflict associated with the changeset exists between the branch and an associated protected branch, and the system may automatically determine whether the changeset is up to date. Upon determining that no merge conflict exists, the system automatically initiates execution of a continuous integration testing pipeline. The continuous integration testing pipeline includes a series of tests applied to the changeset. If the changeset passes the series of tests, the system automatically merges the changeset with the associated protected branch.

20 Claims, 13 Drawing Sheets pre-receive hook

```
#Accept all commits on newly-created branches.
if commit_branch not in repository then
   accept commit
   exit

#Accept all commits on non _merge branches.
if commit_branch.name like '*_merge' then
   accept commit
   exit

#Only certain authors (e.g. the continuous integration user) are permitted
#to commit to directly to the master branch and the _release branches.
if commit_branch.name == 'master' or commit_branch.name like '*_release' then
   if commit_author is in authorized_users then
      accept commit
      exit
   else
      reject commit
      exit

#The _merge branch that is being committed must already have been merged
#with the current HEAD commit of the master branch.
if master_branch.HEAD not in commit_branch then
   reject commit
   exit

#The _merge branch that is being committed must already have been merged
#with the current HEAD commit of the corresponding development branch.
if commit_branch.HEAD != development_branch.HEAD then
   reject commit
   exit accept commit
```

FIG. 10A post-receive hook

```
#If a development branch is being deleted, automatically delete the
#corresponding _merge branch.  If the development branch is a release
#development branch, delete the corresponding _release branch also.
if commit_action == delete then
   delete commit_branch_merge

#A branch name of the form r_* indicates a branch which has a
   #corresponding _release branch which is protected from commits by users
   #other than the continuous integration user.
   if commit_branch.name like 'r_*' then
      delete commit_branch_release
   exit

#If a new development branch is being committed, automatically create the
#corresponding _merge branch.  If the new development branch is intended to
#be a release development branch, create the corresponding _release branch
#also.
if commit_branch not in repository then
   create commit_branch_merge

#A branch name of the form r_* indicates a branch which has a
   #corresponding _release branch which is protected from commits by users
   #other than the continuous integration user.
   if commit_branch.name like 'r_*' then
      create commit_branch_release
   exit

#If an _merge branch is being committed, automatically start a continuous
#integration build.
if commit_branch.name like '*_merge' then
   start continuous integration build of commit_branch
   exit
```

FIG. 10B

METHOD AND SYSTEM TO AUTOMATICALLY ENFORCE A HYBRID BRANCHING STRATEGY

TECHNICAL FIELD

This disclosure generally relates to revision control systems for software engineering, and more particularly, to automatically enforcing a hybrid branching strategy using a revision control system and a continuous integration tool.

BACKGROUND

In the field of software engineering, revision control is a practice that tracks and provides control over changes to collections of information such as source code, documentation, or configuration files. Within software engineering projects, development teams often leverage features of revision control systems to practice various forms of branching. Branching is a mechanism for isolation and parallel development of software applications. Several approaches to branching exist, including: branch per promotion, branch per task, branch per component, branch per technology, branch per release, branch per team, branch per feature, and develop the mainline.

Some approaches favor maximization of productivity, some favor minimization of risk, and others fall somewhere in between. Observing the drawbacks to any given approach results in inefficiencies in the development process that in turn lead to costly decreases in productivity, missed release deadlines, and other issues.

SUMMARY

Systems and methods described here provide automatic enforcement of a hybrid branching strategy. Development activity happens on feature, personal, or release branches and changesets are prevented from immediately being pushed directly to protected branches such as master or release branches. Revision control system hooks may check for compatibility problems or merge conflicts between a branch in question and an associated protected branch. If the revision control system confirms no conflicts exist and the changeset is up to date (e.g., contains all the latest changesets from the protected branch), the revision control system initiates execution of an appropriate continuous integration testing pipeline. Pending successful execution of the appropriate continuous integration pipeline, changesets from the feature, personal, or release branch are automatically merged with the appropriate protected branch (e.g., master or associated release branch).

According to one general aspect, a method for automatically enforcing a hybrid branching strategy includes receiving, using at least one microprocessor of a computing device, a changeset designated for a branch. In response to receiving the changeset, a system may automatically determine whether a merge conflict associated with the changeset exists between the branch and an associated protected branch. Upon determining that no merge conflict exists, the system automatically initiates execution of a continuous integration testing pipeline. The continuous integration testing pipeline includes a series of tests applied to the changeset. If the changeset passes the series of tests, the method includes automatically merging the changeset with the associated protected branch.

Other implementations of this aspect include corresponding systems, apparatus, and computer programs, configured to perform the actions of the methods, encoded on computer storage devices.

One or more of the implementations of the subject matter described here may provide one or more of the following advantages. Software development teams increase efficiency. Development blockers are prevented and an always-releasable mainline is ensured. Positive aspects of branch by task, branch by feature, branch per team, branch per release, and develop the mainline are combined, while many of the pitfalls associated with the approaches are eliminated.

The details of one or more implementations are set forth in the accompanying drawings and the description below. Other features will be apparent from the description and drawings, and from the claims.

BRIEF DESCRIPTION OF THE DRAWINGS

FIG. 10A is an example of pseudo code for a pre-receive hook.

FIG. 10B is an example of pseudo code for a post-receive hook.

Like reference symbols in the various drawings indicate like elements.

DETAILED DESCRIPTION

Figure 1:
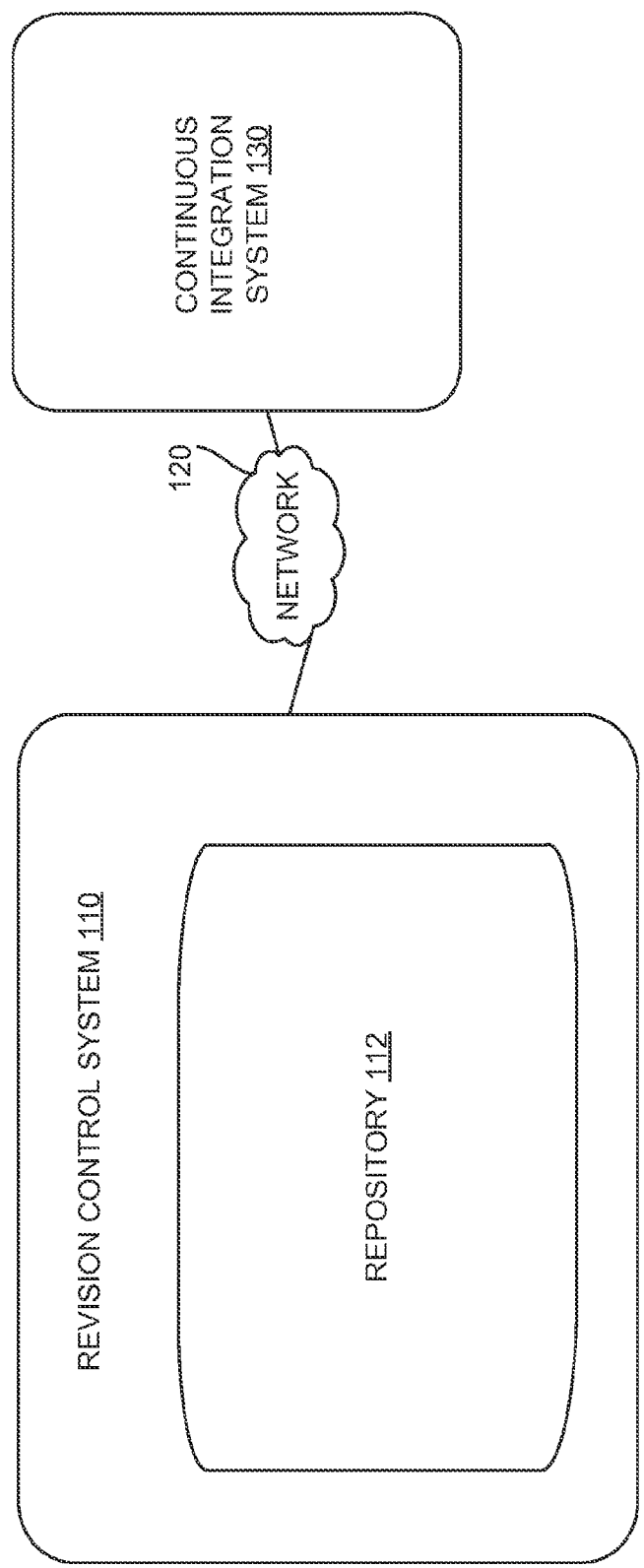
FIG. 1 is a block diagram of a system that can be used to provide hybrid branching.

FIG. 1 is a block diagram of a system that can be used to provide hybrid branching. System 100 may include a revision control system 110. The revision control system 110 may be, for example, a source code management system. The revision control system 110 may include a repository 112. The repository 112 may be a data store that may store documentation, source code, configuration files, or other collections of information. In some implementations, the revision control system 110 may be an application such as GIT. In various implementations, various individual computing devices may be configured as a distributed system and each of the individual computing devices may each have their own separate repository.

The system 100 may also include a continuous integration system 130. The revision control system 110 and the continuous integration system 130 may be interconnected through at least one network 120. Network 120 may be a single network or a combination of any type of computer network, such as a Local Area Network (LAN) or a Wide Area Network (WAN), a WIFI network, a BLUETOOTH network, or other network. In addition, network 120 may be a combination of public (e.g., Internet) and private networks.

In some implementations, the continuous integration system 130 may be an application such as JENKINS. The continuous integration system 130 may be used to test and enforce at least one branch of an application. A "branch" is a line of development of an application or system, which exists independent of another line of development, yet shares a common history. A branch may be a copy of some existing version, release, task, component, etc. of an application. A branch may be, as examples, a new release, a new task, a new architectural component, a new version, or other differentiating aspect of an application. Certain branches are created with the intention of eventually merging somewhere at a future time.

Different branches may exist in a system. One branch is called a "master" branch, which may also be known as a trunk. The "master" branch may be thought of as a trunk of a tree, and a feature branch or a release branch may be limbs of the tree. A developer may develop a particular feature or functionality for an application, using a "feature" branch. Such a feature may eventually get integrated into a master or protected application (e.g., a version of the master branch) from which release branches are created.

A "release" branch may be created every time a system releases a new feature for the application. Thus, a system may have an arbitrary and potentially changing number of release branches tier each version of a release. For example, a first release of an application may be numbered r__1.0. A release branch may be automatically numbered as it is released, for example, as r__1.0, r__1.1, r__1.2., etc., until a new version of the application r__2.0) is created. For purposes of this description, a release branch may be referred to here as r*, and a feature branch may be referred to here as f*, where the * indicates a version number or identifier.

As an application is created, a system may also automatically create a r__1.0_merge branch and r__1.0_release branch. If a user pushes a changeset to r__1.0, nothing may happen regarding continuous integration system because such a changeset would not affect a released product. Yet, if a user attempts to push a changeset to r__1.0_merge, then the system may automatically implement a continuous integration testing pipeline, for example to ensure that the changes will not cause conflicts, for example with existing features of the application. If the changeset successfully passes the continuous integration testing pipeline, then the changes may get automatically merged into r__1.0_release, as described in more detail below with respect to FIG. 2 and FIG. 3.

The components illustrated in association with system 100 are merely for illustration, as other components may be included. For example, it will be appreciated that any number of alternative or additional networks, computers, systems, servers, services, mobile devices, or other devices may be included in system 100. Various alternative and additional examples of devices are described in more detail with respect to FIG. 11.

One or more of the implementations of the subject matter described here may provide one or more of the following advantages. Software development teams increase efficiency at least because system 100 automatically prevents development blockers and ensures an always-releasable mainline. The system 100 combines positive aspects of branch by task, branch by feature, branch per team, branch per release, and develop the mainline, while many of the pitfalls associated with the approaches are eliminated.

Figure 2:
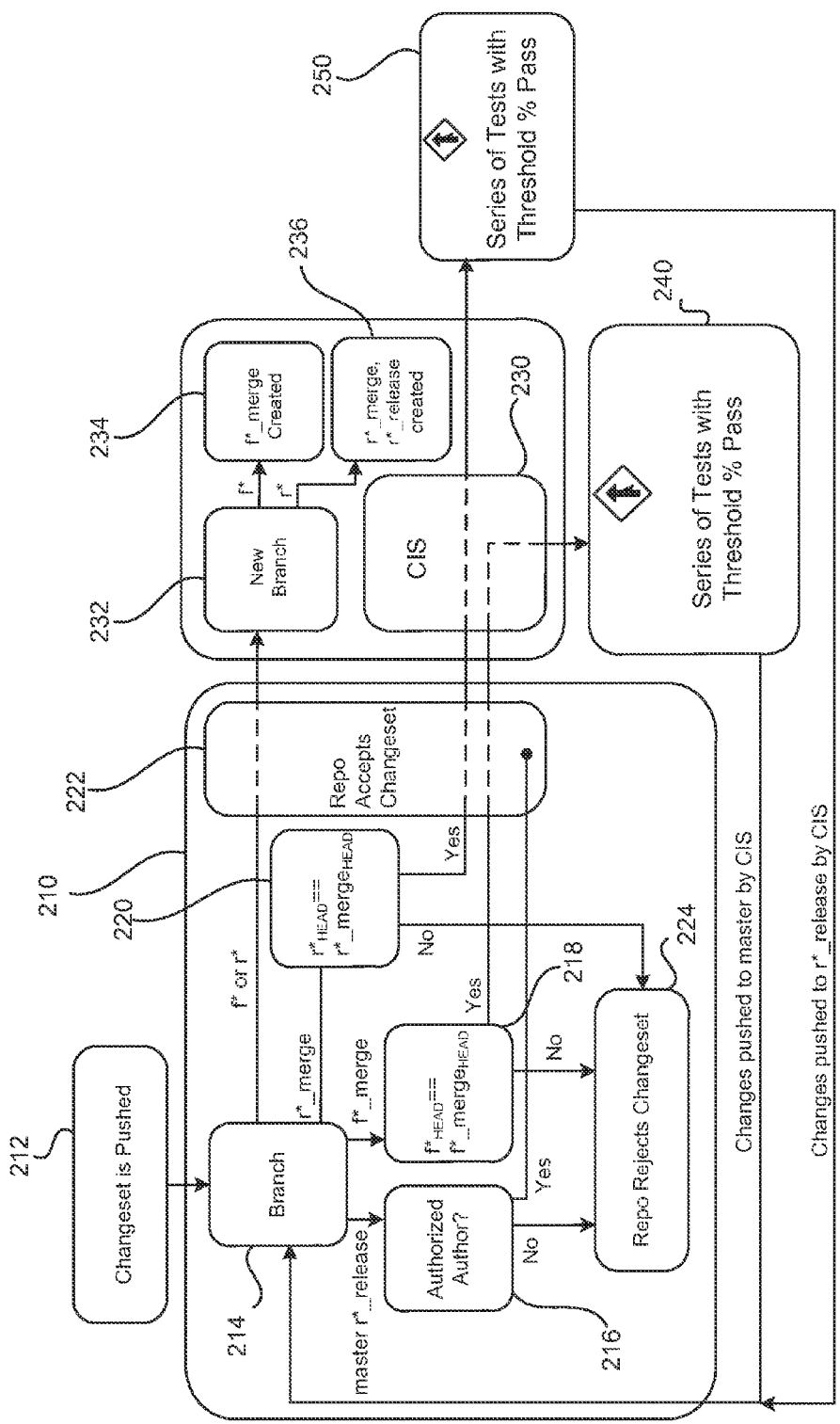
FIG. 2 is a sequence diagram illustrating an example of a system implementing hybrid branching.

FIG. 2 is a sequence diagram illustrating an example of a system 200 implementing hybrid branching. The system 200 may include a revision control system 210 and a continuous integration system 230. The revision control system 210 may be a source code management system such as system 110 shown in FIG. 1.

In the illustrated example sequence, the black lines associated with each of the components of the system represent the execution, by at least one microprocessor, of a process associated with that component.

A developer may push a changeset 212 to a branch 214 in the revision control system 210, for example using processes made available by the revision control system 210. The changeset 212 may include any set of new or modified features, such as source code, documentation, or configuration files. In some implementations, the branch 214 may be an existing branch existing within a repository (such as repository 112 shown in FIG. 1), or the branch may be a new branch created by the developer. The system may automatically determine, or a developer may designate, which branch the changeset is designated for (e.g., a feature branch or a release branch).

If the changeset is pushed to (i.e., deployed to, installed on, designated for, sent to, etc.) a feature branch (or in some implementations, a release branch acting as a feature branch), and not to a merge branch, the repository accepts the changeset (222) and the system may automatically create a new branch (232) if the branch did not previously exist. In the case of a changeset for a feature, the system may automatically create f*_merge (234). In the case of a changeset for a release, the system may automatically create r*_merge, and r*_release (236), and no action may happen at that time with respect to a continuous integration testing pipeline.

If the branch is a release*_merge branch, the system may determine whether the head (r*head) is equivalent to a merge head (r*_merge$_{HEAD}$) (220). If no, then the repository may automatically reject the changeset (224). If yes, then the repository may accept the changeset (222), and the system may automatically implement execution of a continuous integration testing pipeline via the continuous integration system (230).

As shown FIG. 2, the continuous integration system (230) may implement a series of tests for each changeset (e.g., two or more tests), for example as illustrated by block 250. The system may implement a separate series of tests (e.g., continuous integration testing pipeline) for each release. The series of tests may include unit tests, integration tests, user interface tests, or other tests. The relevant automated tests are executed to evaluate the stability and utility of a changeset. The exact content of the tests may vary from project to project. The series of tests may have an overall predetermined threshold (e.g., 90%, 100%, etc.) that is required to pass one or more of the series of tests. The predetermined threshold may be set and modified by a developer with permission to make such modifications using, for example, the continuous integration system. If the changeset does not automatically pass the series of tests (for example, by not equaling or exceeding the predetermined threshold which may be for example a percentage such as 100%,90%, etc.), then the system automatically determines that changes should not be applied to the master (e.g., protected) branch, and the system may automatically prevent the changeset from being pushed to the protected branch (not shown), without requiring additional user input at that stage. In that implementation, the changes may still exist on an underlying r*_merge or f*_merge branch, even though the changes do not get integrated into the protected branch because they failed at least one of the series of tests. If those changes were integrated they might cause issues when integrated into the protected branch. Thus, the system isolates the potentially harmful changes to a feature branch.

If the changeset passes the series of tests (e.g., by meeting or exceeding the threshold for all of the tests), then the changes from the changeset are pushed to the r*_release branch by the continuous integration system, as shown by the arrow from block 250 to block 214.

If the changeset passes the series of tests, then the changes from the changeset are automatically pushed to the protected branch by the continuous integration system, as shown by the arrow from 250 to 214. The changes are automatically pushed by the system without requiring additional user input at that stage.

With a changeset that is designated for a feature merge (f*_merge) branch, the system may automatically determine whether the head (f*head) is equivalent to a merge head (f*_merge$_{HEAD}$) (218). If no, then the repository may automatically reject the changeset (224). If yes, then the repository accepts the changeset (222) and the system automatically implements execution of a continuous integration testing pipeline via the continuous integration system (230). A series of tests with a threshold required to pass are conducted (240). If the changeset passes the series of tests, the changes from the changeset are automatically pushed to the protected branch by the continuous integration system, as shown by the arrow from 240 to 214. If the changeset fails the series of tests, (for example, by not equaling or exceeding the predetermined threshold), then the system automatically determines that changes should not be pushed to the master branch, and the system may automatically prevent the changeset from being pushed to the master branch (not shown).

In some implementations, as an additional protection, before the changes are pushed to the r*_release branch or to the master branch, the system may determine if the author of the changeset is an authorized author. For example, if the changeset for a branch (214) is for a master or r*_release branch, the system may then automatically determine whether the author (e.g., immediate sender) of the changeset is authorized (216). In some implementations, only the continuous integration system (e.g., the continuous integration system 230) is designated as an authorized author for the system. If the author is authorized (for example, if the sender is the continuous integration system), the repository may automatically accept the changeset (222), because it has successfully passed through the continuous integration testing pipeline. The changeset may have successfully passed through the continuous integration testing pipeline for example by exceeding the predetermined threshold of a series of tests. If the author of the changeset is not authorized, the repository may automatically reject the changeset (224), without further input from a user. In such an implementation, a user may not automatically push a changeset to a master or r*_release branch, and each changeset is required to past through the continuous integration testing pipeline.

Figure 3:
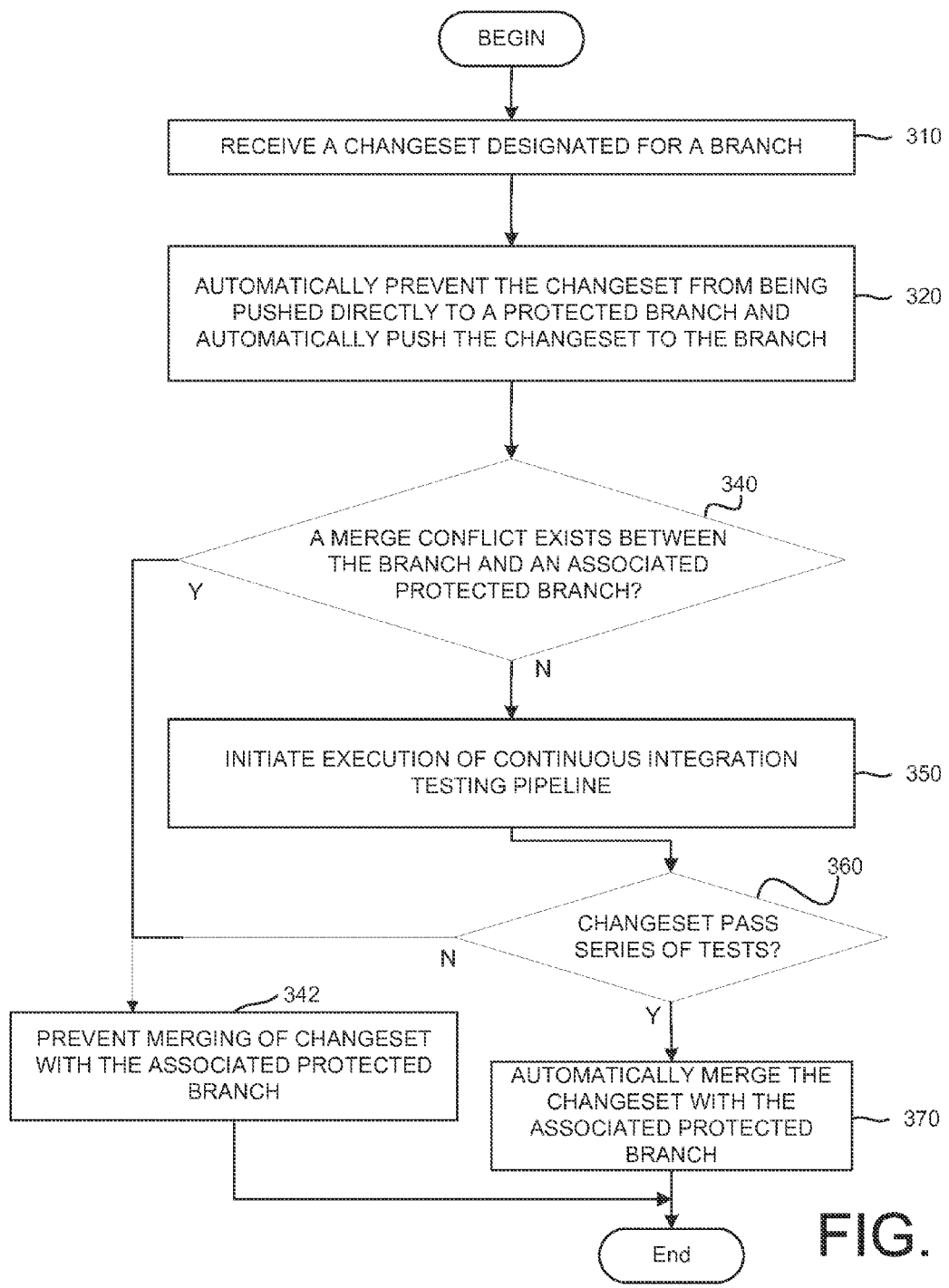
FIG. 3 is a flowchart of an example process for implementing hybrid branching.

FIG. 3 is a flowchart of an example process for implementing hybrid branching. The process illustrated in FIG. 3 may be performed at least in part by a system, fur example, the system 100 shown in FIG. 1. As shown in FIG. 3, a system may receive a changeset designated for a branch (310). In some implementations, the changeset is designated for a feature, personal, or release branch. The changeset may be pushed by a developer. In various implementations, each developer may have their own isolated branch called a personal branch.

The system may automatically prevent the changeset from being pushed directly to a protected branch (e.g. a master branch or r*_release branch), or may automatically merge the pushed changeset to a protected branch (320) (e.g. the master or r*_release branch) based on the outcome of checks enacted by hooks and results of automated tests executed by the continuous integration tool.

In some implementations, the changeset is designated for testing or for integration with a protected branch (e.g., a changeset intended to be merged with a master or release branch) (not shown). In such an implementation, the changeset may be designated for r*_merge or f*_merge branches, for example. In response to the receiving that changeset, the system may automatically determine an associated protected branch. The system may automatically determine whether a merge conflict exists between the branch and the associated protected branch (340). If the system detects that a merge conflict exists (340, Y), the system may prevent merging of the changeset with the associated protected branch (342), and in some implementations, the process may end. A merge conflict may exist if two changesets contain incompatible changes to one or more pairs of the same content across the two versions in question. If the system detects that no merge conflict exists (340, N), the system may initiate execution of a continuous integration testing pipeline (350). In some implementations, the continuous integration testing pipeline may include a series of tests implemented by a continuous integration system (such as continuous integration system 130 shown in FIG. 1). In various implementations, each test, or the overall series of tests, may be associated with a predetermined threshold required to pass the test(s). In some implementations, the threshold is modifiable. For example, in some cases, the threshold may be 100% pass rate of all tests. The system may automatically determine whether the test changeset passes the series of tests (360). If the test changeset does not pass the series of tests (360, N), the system may automatically prevent merging of the changeset with the associated protected branch (342), and in some implementations, the process may end. If the test changeset passes the series of tests (360, Y), the system may automatically merge the test changeset with the associated protected branch (370).

In some implementations, in response to receiving the test changeset, the system automatically checks for a compatibility issue between the branch and the associated protected branch. In various implementations, the test changeset includes a set of new modifications not stored in a repository of the revision control system. In certain implementations, the system automatically provides feedback to a developer during (or after) the execution of the continuous integration testing pipeline. For example, the feedback may include results of one or more of the series of tests.

Figure 4:
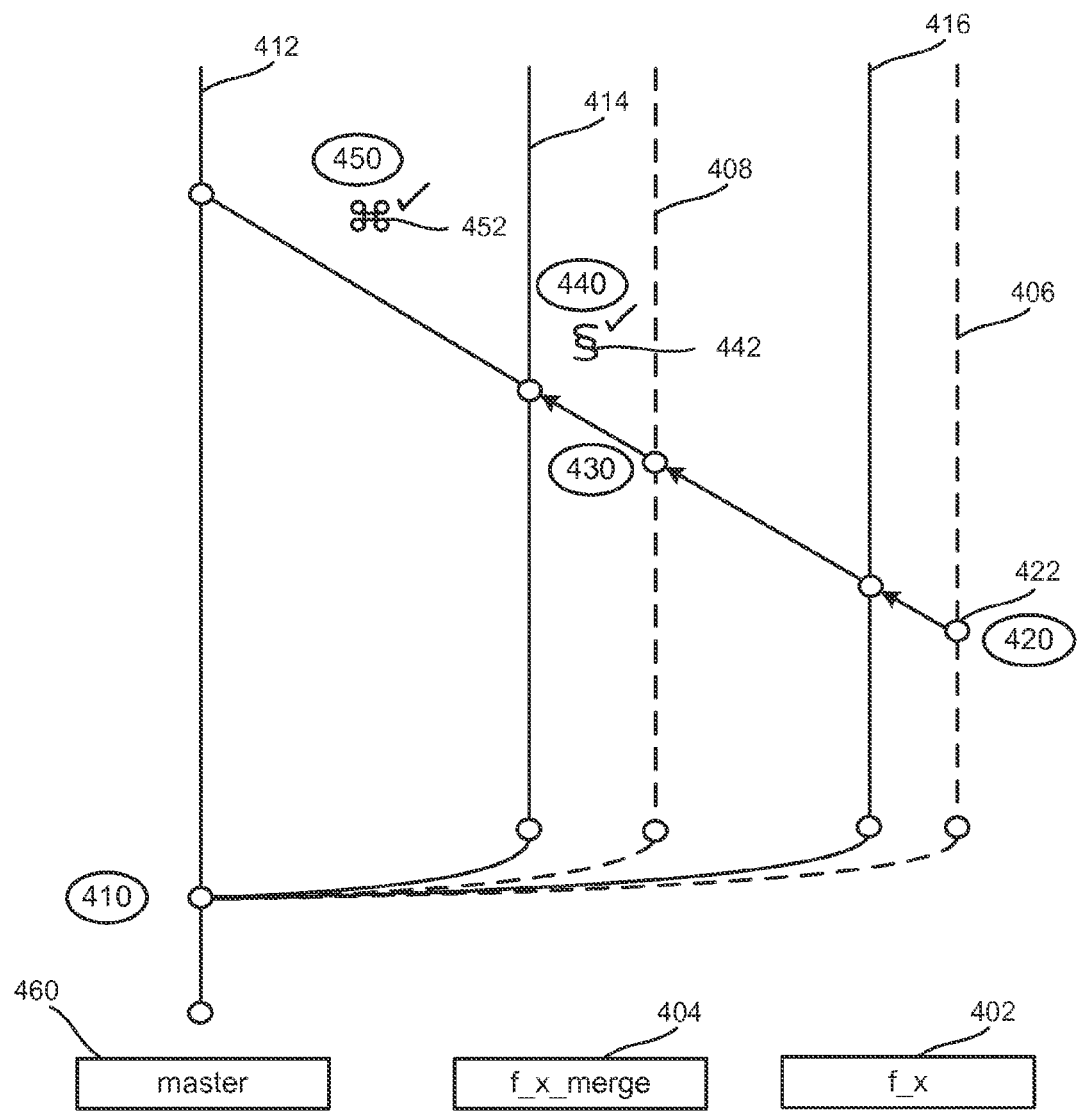
FIG. 4 is a sequence diagram illustrating an example of a changeset pushed to a merge branch.

FIG. 4 is a sequence diagram illustrating an example of a changeset pushed to a merge branch. The example shown in FIG. 4 uses one developer and one feature branch. A changeset pushed to a *_merge branch gets automatically merged with a target branch in this example. At stage 410, the developer Alice creates branches f_x 402 and f_x_merge 404. Lines 406 and 408 illustrate local branches, whereas lines 412, 414, and 416 illustrate repository branches. At stage 420, Alice commits as shown by circle 422, and pushes a changeset to f_x 402.

At stage 430. Alice pushes changes from stage 420 to f_x merge 404 (e.g., directly or via a script). At stage 440, system hooks 442 check if both the head of the master branch 460 and the head of f_x_merge 404 are in f_x 402, and the repository accepts the changeset.

A branch (e.g. master branch 460, f_x branch 402, f_x_merge branch 404, etc.) may include an ordered list of changesets. The "head" may be the most recently added changeset on a branch. It is possible for a single changeset to be in the list for multiple branches at the same time. The system hooks 442 may check to see if the changeset at the head of the master branch 460 and at the head of f_x_merge 404 is also f_x 402, but not necessarily at the head of f_x 402.

At stage 450, the master pipeline 452 executes the series of tests, the tests pass a success threshold, and changes from stage 420 are automatically merged with the master branch 460, by a continuous integration tool (e.g., the continuous integration system 130 shown in FIG. 1). As a result, in this example, changes from a feature branch are integrated into a master branch, automatically; by the continuous integration tool.

Figure 5:
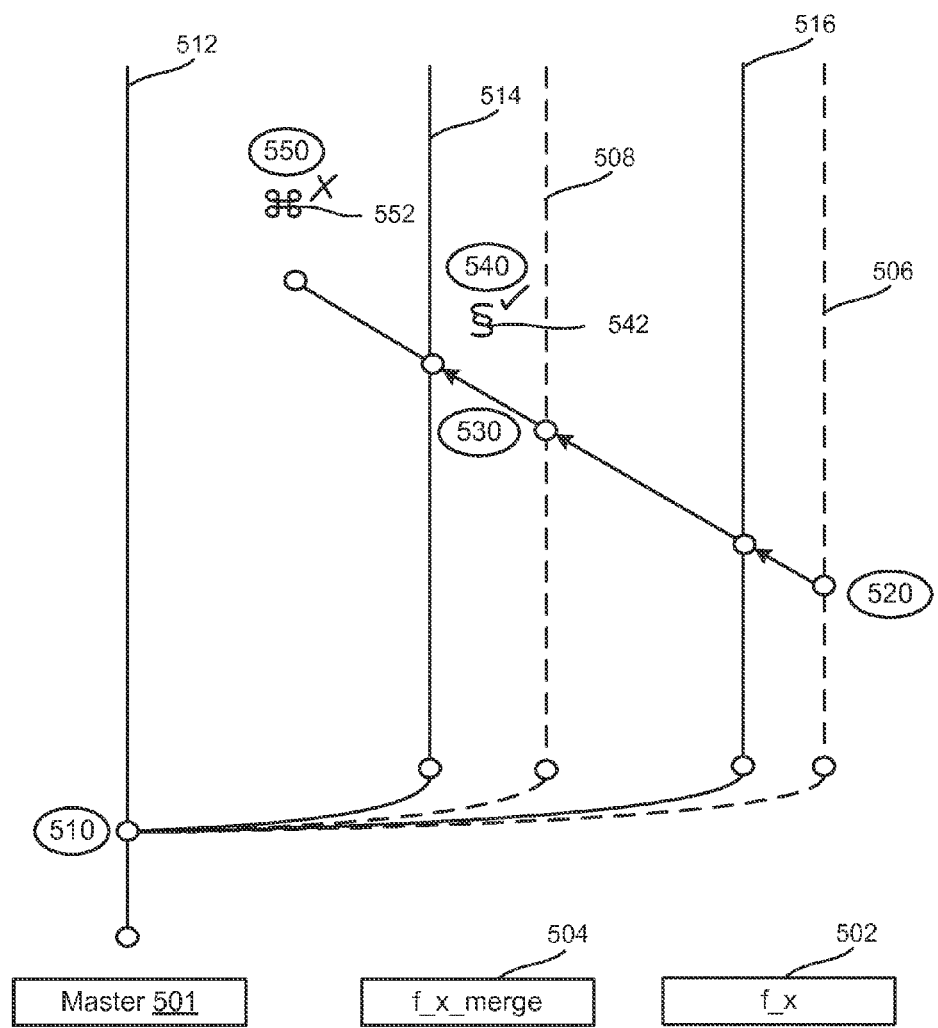
FIG. 5 is a sequence diagram illustrating another example of a changeset pushed to a merge branch.

FIG. 5 is a sequence diagram illustrating another example of a changeset pushed to a merge branch. The example shown in FIG. 5 uses one developer and one feature branch. A changeset pushed to a *_merge branch fails to reach a target branch, due to automated failures, in this example shown in FIG. 5. At stage 510, the developer Alice creates branches f_x 502 and f_x_merge 504. Lines 506 and 508 illustrate local branches, whereas lines 512, 514, and 516 illustrate repository branches. At stage 520, Alice commits and pushes a changeset to f_x 502.

At stage 530, Alice pushes changes from stage 520 to f_x merge 504. At stage 540, system hooks 542 check if both the head of the master branch 501 and the head of f_x_merge 504 are in f_x 502 and the repository accepts the changeset. At stage 550, the master pipeline 552 executes the series of tests. In this example, the tests fail a success threshold, and changes from stage 520 are not merged with the master branch 501. As a result, in this example, the master branch is shielded from a harmful commit, and other developers are unaffected.

Figure 6:
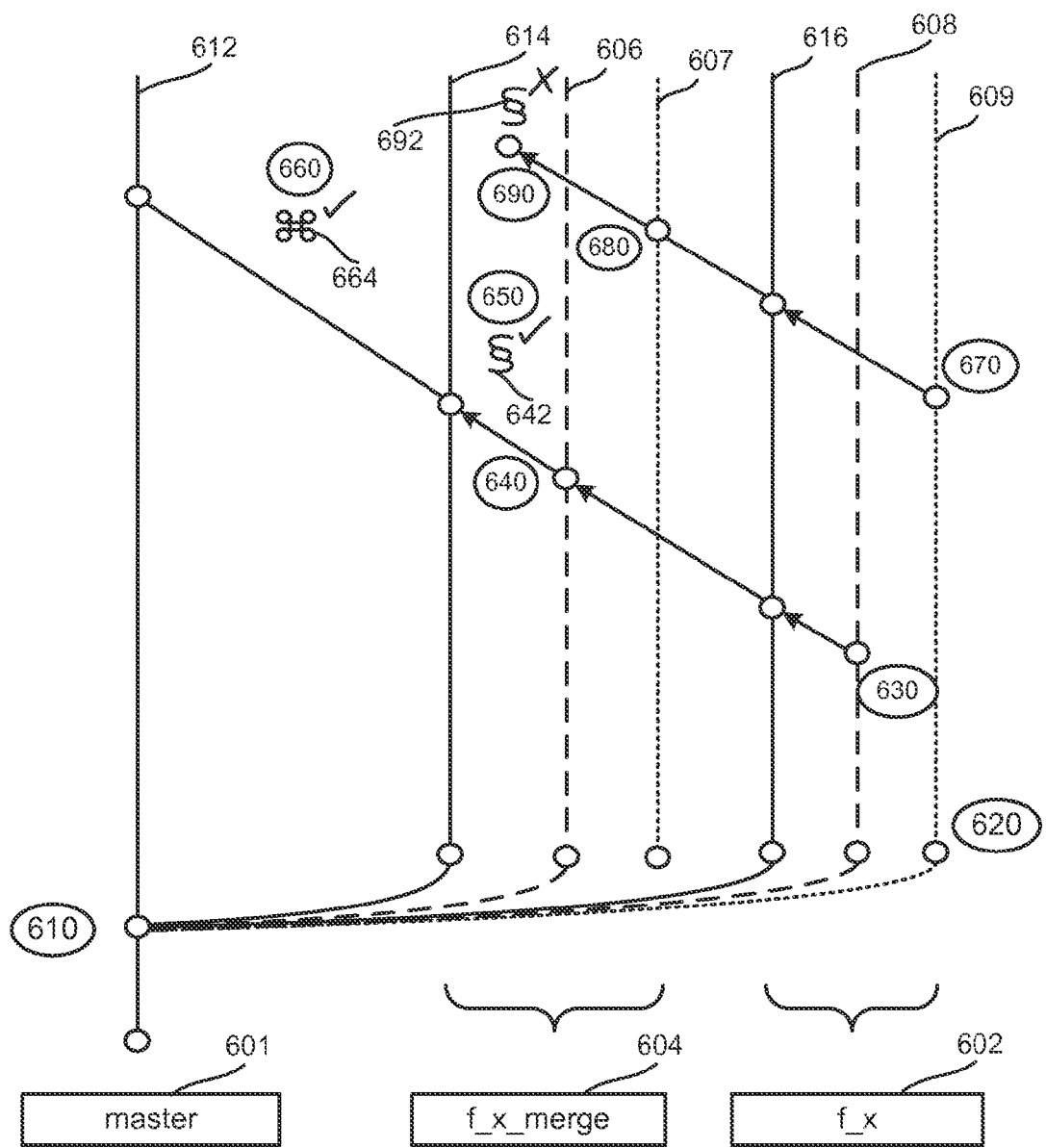
FIG. 6 is a sequence diagram illustrating another example of a changeset pushed to a merge branch.

FIG. 6 is a sequence diagram illustrating another example of a changeset pushed to a merge branch. The example shown in FIG. 6 uses two developers (Bob and Mice) and one feature branch. A changeset pushed to a *_merge branch fails to reach a target branch, due to being out of date, in this example shown in FIG. 6.

At stage 610, the developer Alice creates branches f_x 602 and f_x_merge 604. Lines 606, 607, 608, and 609 illustrate local branches, whereas lines 612, 614, and 616 illustrate repository branches. At stage 620, Bob checks out f_x 602.

At stage 630, Alice commits and pushes a changeset to f_x 602. At stage 640, Alice pushes changes from stage 630 to f_x_merge 604. A stage 650, system hooks 642 check if both the head of the master branch 601 and the head of f_x_merge 604 are in f_x 602 and the repository accepts the changeset.

At stage 660, the master pipeline 664 executes, tests pass a success threshold, and changes from stage 620 are merged with the master branch 601 automatically by a continuous integration tool.

At stage 670, Bob commits and pushes a changeset to f_x 602. At stage 680, Bob attempts to push changes from stage 620 to f_x_merge 604, without first pulling f_x_merge 60.4 into a local branch. At stage 690, a system hook 692 denies the changeset on f_x_merge 604 because the head of f_x_merge is not included within the changeset. As a result, the master branch 601 and the f_x_merge branch 604 are protected from a potential problem resulting from committing out of date changes.

Figure 7:
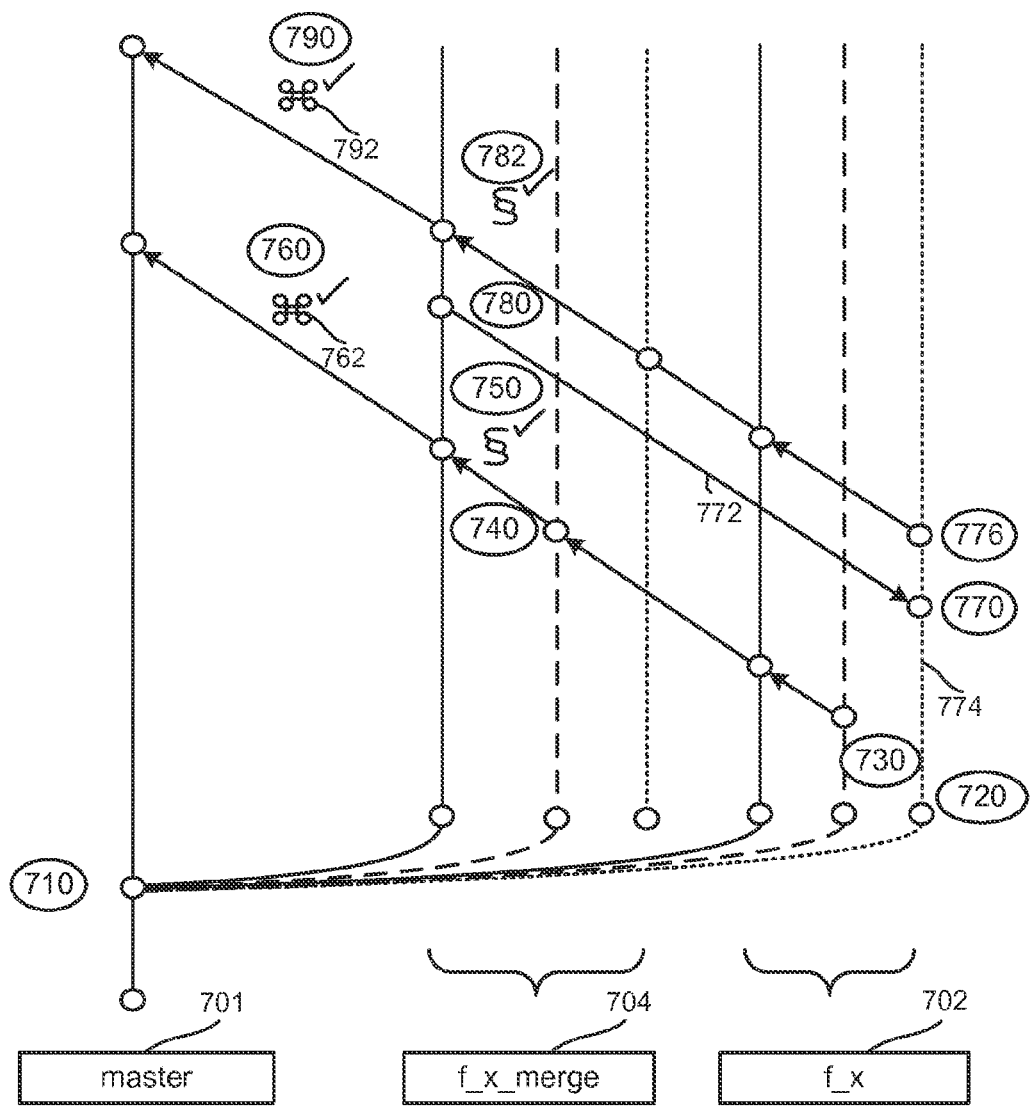
FIG. 7 is a sequence diagram illustrating another example of a changeset pushed to a merge branch.

FIG. 7 is a sequence diagram illustrating another example of a changeset pushed to a merge branch. The example shown in FIG. 7 uses two developers (Bob and Alice) and one feature branch. A changeset pushed to a *_merge branch reaches a target branch, in this example.

At stage 710, Alice creates branches f*_ 702 and f_x_merge 704. At stage 720, Bob checks out f_x 702. At stage 730, Alice commits and pushes a changeset to f_x 702.

At stage 740, Alice pushes changes from stage 720 to f_x_merge 704. At stage 750, system hooks check if both the head of the master 701 and the head of f_x_merge 704 are f_x 702, and the repository accepts the changeset.

At stage 760, the master pipeline 762 executes and tests pass a success threshold. Changes from stage 720 are merged with the master automatically by the continuous integration tool. At stage 770, Bob pulls 772 Alice's changes from stage 730 into his local f_x 774. At stage 776, Bob commits and pushes a changeset to f_x 702. At stage 780, Bob pushes changes from stage 776 to f_x_merge 704. At stage 782, system hooks check if both the head of master 701 and head of f_x_merge 704 are in f_x 702 and the repository accepts changeset. At stage 790, the master pipeline 792 executes and tests pass a success threshold. Changes from stage 776 are merged with the master 701 automatically by the continuous integration tool. As a result, in this example, changes from the feature branch are integrated into a master branch automatically by a continuous integration tool.

Figure 8:
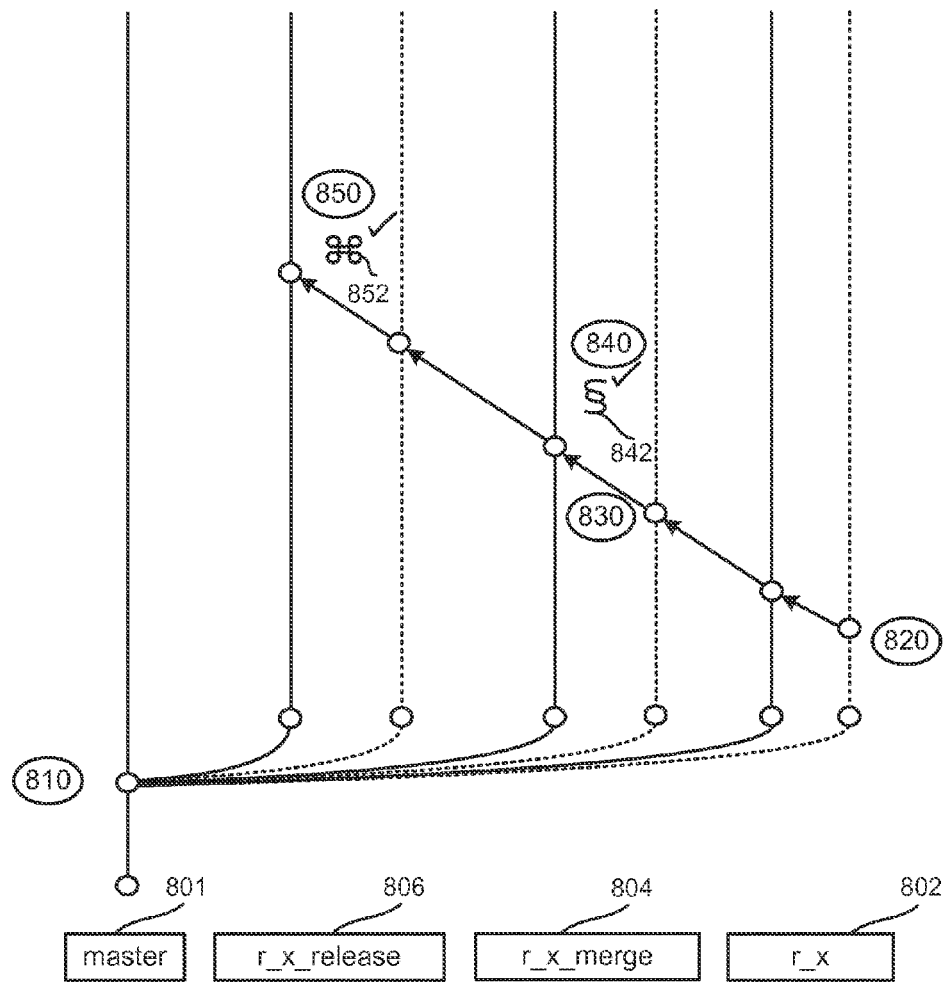
FIG. 8 is a sequence diagram illustrating an example of hybrid branching.

FIG. 8 is a sequence diagram illustrating an example of hybrid branching. The example shown in FIG. 8 uses one developer (Alice), one release branch, and a master branch. A release branch is created, and a changeset is pushed to a *_merge branch and gets automatically merged with *_release, in this example.

At stage 810, the developer Alice creates branches r_x 802, r_x_merge 804, and r_x_release 806. At stage 820, Alice commits and pushes a changeset to r_x 802. At stage 830, Alice pushes changes from stage 820 to r_x_merge 804. At stage 840, system hooks 842 check if both the head of master 801 and the head of r_x_merge 804 are in r_x 802, and the repository accepts the changeset. At stage 850, the r_x pipeline 852 executes and tests pass a success threshold. Changes from stage 820 are merged with r_x_release 806 (separate from the master 801) automatically by the continuous integration tool As a result, in this example, changes from a feature branch are integrated into r_x_release 806 automatically by the continuous integration tool.

Figure 9A:
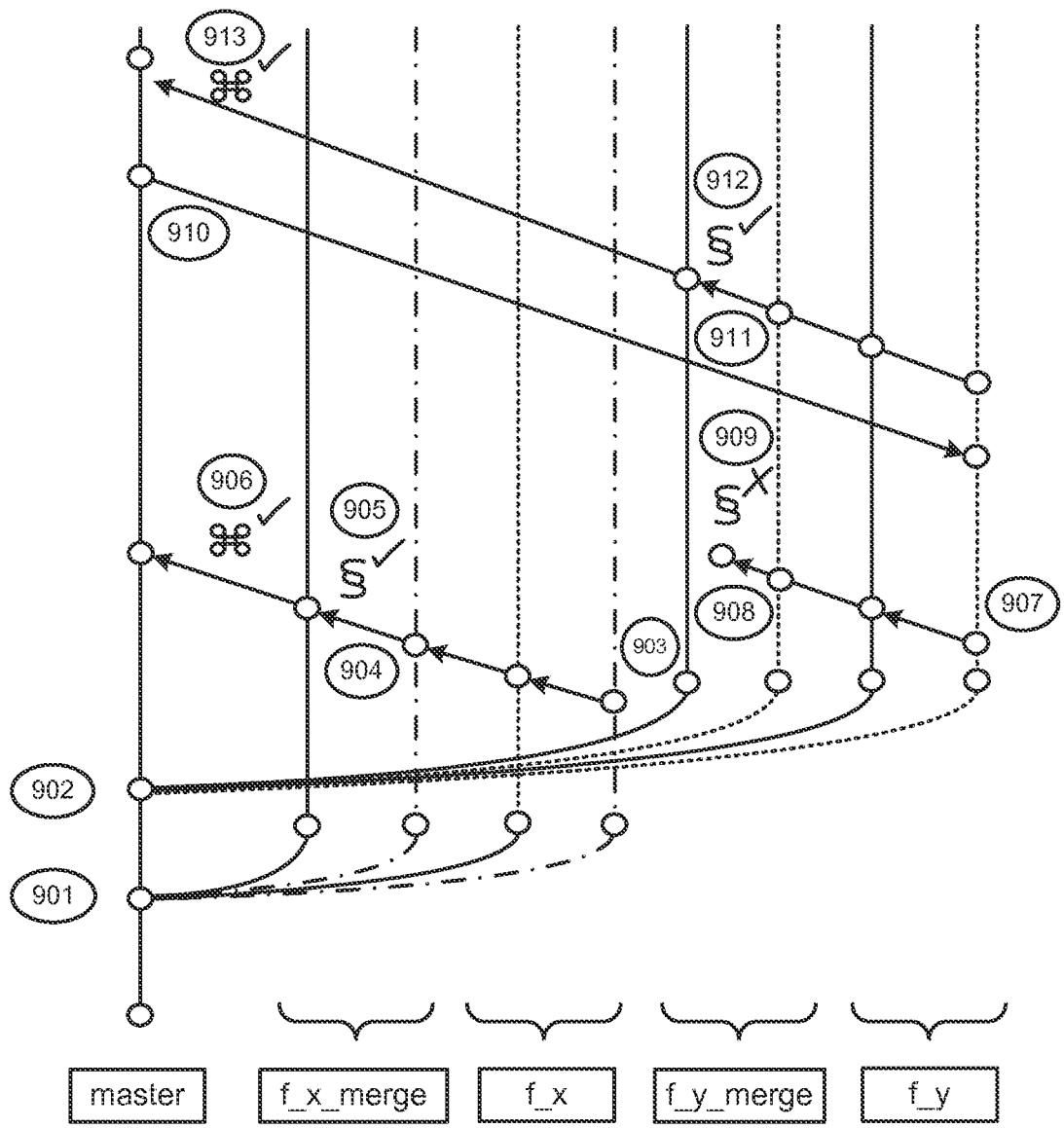
FIG. 9A is a sequence diagram illustrating an example of hybrid branching.

FIG. 9A is a sequence diagram illustrating an example of hybrid branching. In this example, two developers and two feature branches are illustrated. A changeset is pushed to a *_merge branch that initially fails to reach a target branch due to being out of date, but gets merged after updating.

At stage 901, Alice creates f_x and f_x_merge branches. At stage 902, Bob creates f_y and f_y_merge branches. At stage 903, Alice commits and pushes a changeset to f_x, At stage 904, Alice pushes changes from stage 903 to f_x_merge. At stage 905, system hooks check if both the head of the master and the head of f_x_merge are in f_x and the repository accepts the changeset. At stage 906, the master pipeline executes and tests pass success threshold and changes from stage 903 are merged with master automatically by the continuous integration tool. At stage 907, Bob commits and pushes a changeset to f_y. At stage 908, Bob pushes changes from stage 907 to f_y_merge. At stage 909, system hooks check if both the head of the master and the head of f_y_merge are in f_y and the repository rejects the changeset because it is out of date having not pulled in Alice's changes from 903 that were merged into master in 906. At stage 910, Bob pulls changes to master from stage 906 into f_y. At stage 911, Bob pushes changes from stage 907 (including those from 906) to f_y_merge. At stage 912, system hooks check if both the head of the master and the head of f_y_merge are in f_y and the repository accepts the changeset. At stage 913, the master pipeline executes and tests meet a success threshold, and changes from stage 907 are merged into the master branch automatically by the continuous integration tool.

As a result, the system forces Bob to keep his branch up to date (e.g., containing the latest changesets from the protected branch) before allowing his changes to be tested or merged with the master branch.

Figure 9B:
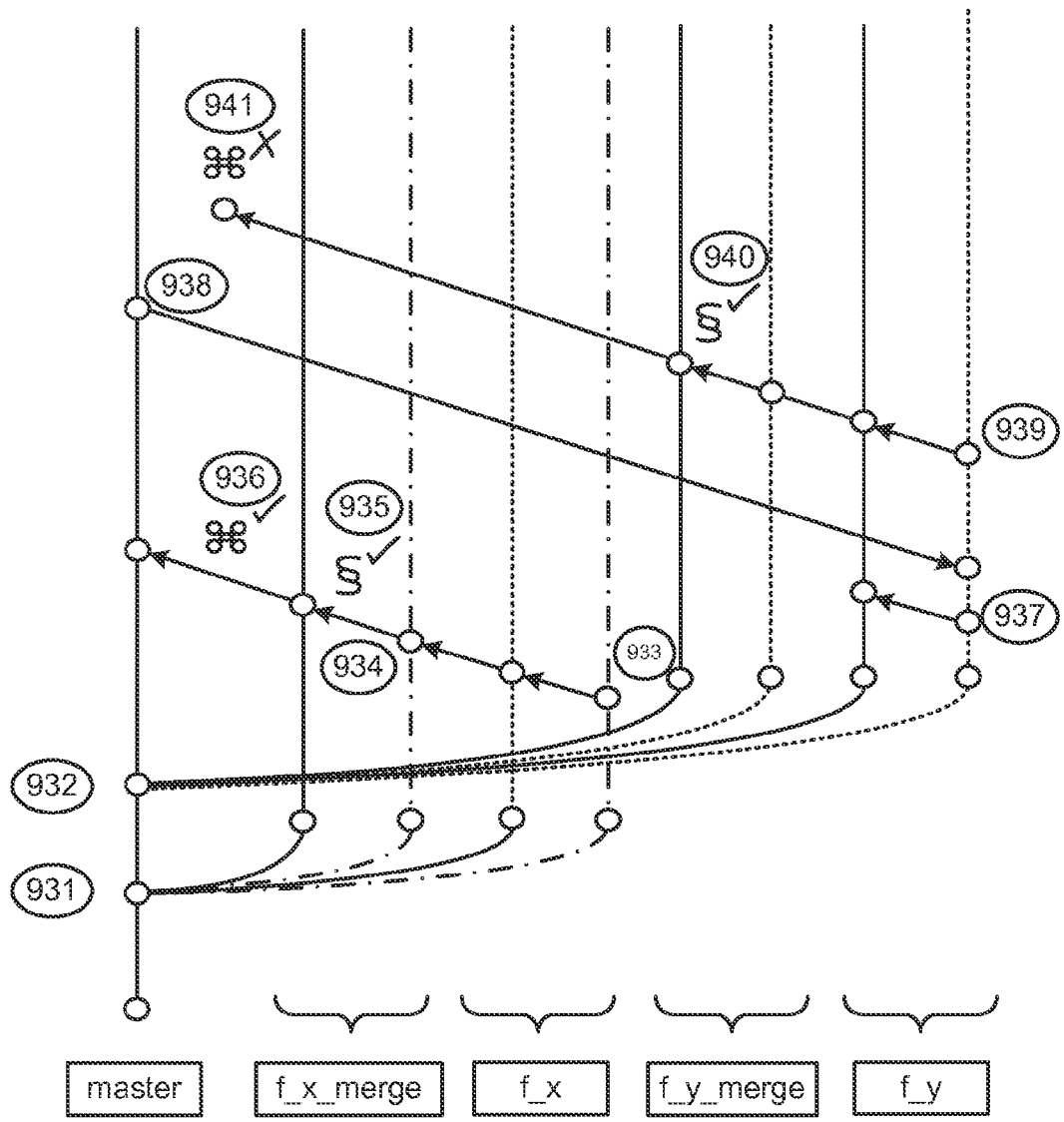
FIG. 9B is a sequence diagram illustrating an example of hybrid branching.

FIG. 9B is a sequence diagram illustrating another example of hybrid branching. In this example, two developers and two feature branches are illustrated. A changeset is pushed to a *_merge branch that fails due to automated test failures.

At stage 931, Alice creates f_x and f_x_merge branches. At stage 932, Bob creates f_y and f_y_merge branches. At stage 933, Alice commits and pushes a changeset to f_x. At stage 934, Alice pushes changes from stage 933 to f_x_merge. At stage 935, system hooks check if both the head of the master and the head of f_x_merge are in f_x and the repository accepts the changeset. At stage 936, the master pipeline executes and tests pass success threshold and changes from stage 933 are merged with master automatically by the continuous integration tool. At stage 937, Bob commits and pushes a changeset to f_y. At stage 938, Bob pulls changes to the master branch from stage 933 into f_y. At stage 939, Bob pushes changes from stage 937 (including those from 933) to f_y_merge. At stage 940, system hooks check if both the head of the master and the head of f_y_merge are in f_y and the repository accepts the changeset. At stage 941, the master pipeline executes the series of tests. In this example, the tests fail to meet a success threshold, and changes from stage 939 are not merged with the master branch automatically by the continuous integration tool.

As a result, the master branch is shielded from a harmful commit and other developers working on other branches remain unaffected.

FIG. 10A is an example of pseudo code for a pre-receive hook. The system may accept all commits on newly created branches and non-merge branches. Only certain authors, such as the continuous integration user, may be permitted to commit directly to the master branch and the release branches. A merge branch that is being committed should have already been merged with the current head commit of the master branch. The merge branch that is being committed must have already been merged with the current head of the corresponding development branch.

FIG. 10B is an example of pseudo code for a post-receive hook. If a development branch is being deleted, the system may automatically delete the corresponding merge branch. If a new development branch is being committed, the system may automatically create the corresponding merge branch. If the new development branch is intended to be a release development branch, the system may create the corresponding release branch. If a merge branch is being committed, the system may automatically start a continuous integration build.

Figure 11:
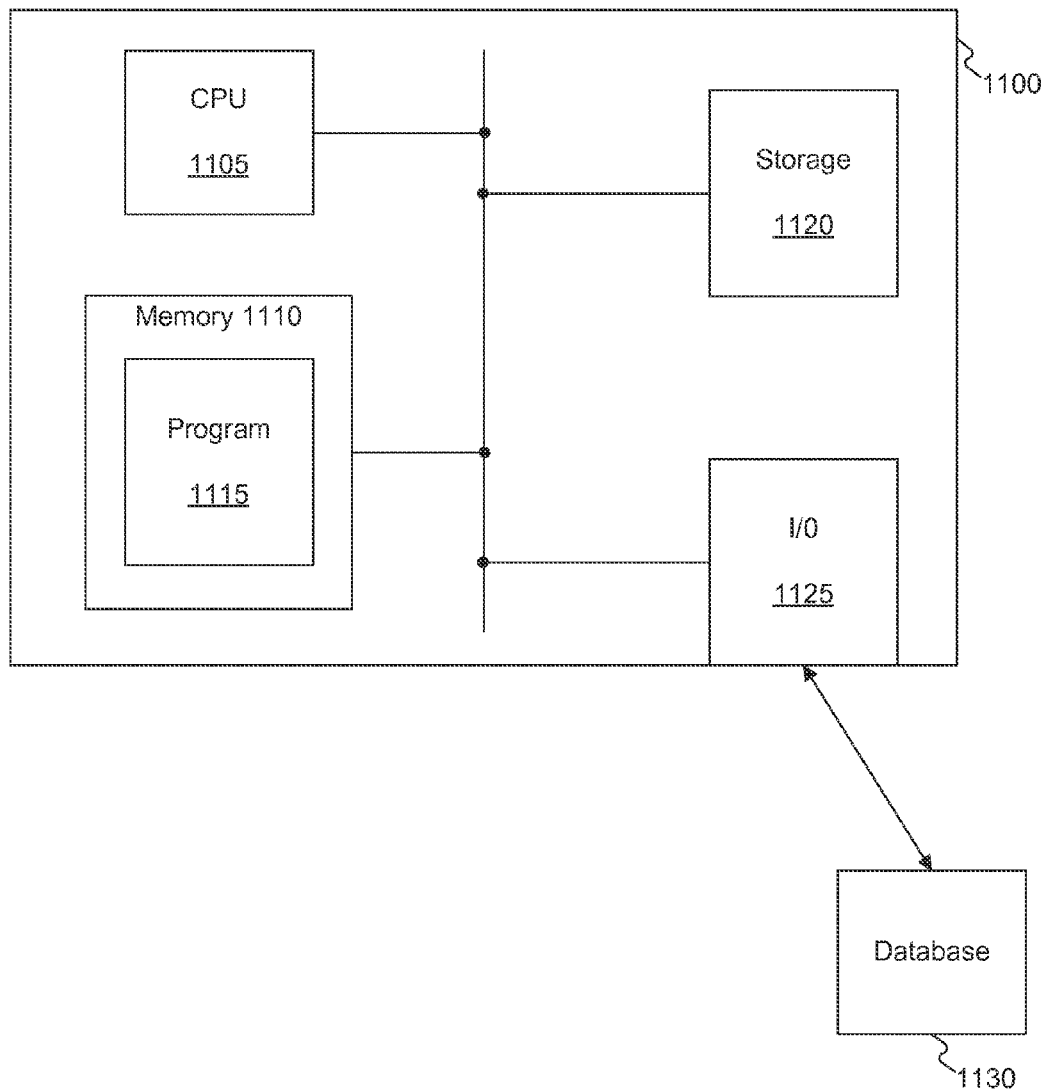
FIG. 11 illustrates an example of a computing system that can be used to implement the techniques described here.

FIG. 11 illustrates an example of a computing system that can be used to implement the techniques described here. The system 1100 is intended to represent various forms of digital computers, such as laptops, desktops, workstations, personal digital assistants, servers, blade servers, mainframes, mobile devices, and other appropriate computers.

The components and arrangement of the system 1100 may be varied. The system 1100 includes a number of components, such as a central processing unit (CPU) 1105, a memory 1110, an input/output (I/O) device(s) 1125, a nonvolatile storage device 1120, and a database 1130. The system 1100 can be implemented in various ways. For example, an integrated platform (such as a workstation, personal computer, laptop, etc.) may comprise the CPU 1105, the memory 1110, the nonvolatile storage 1120, and I/O devices 1125. In such a configuration, components 1105, 1110, 1120, and 1125 may connect through a local bus interface and access database 1130 (shown implemented as a separate database system) via an external connection. This connection may be implemented through a direct communication link, a local area network (LAN), a wide area network (WAN) and/or other suitable connections. The system 1100 may be standalone or it may be part of a subsystem, which may, in turn, be part of a larger system.

The CPU 1105 may be one or more processing devices, such as a microprocessor. The memory 1110 may be one or more storage devices configured to store information used by CPU 1105 to perform certain functions related to embodiments of the present invention. The storage 1120 may be a volatile or non-volatile, magnetic, semiconductor, tape, optical, removable, nonremovable, or other type of storage device or computer-readable medium. In one embodiment, the memory 1110 includes one or more programs or subprograms 1115 loaded from storage 1120 or elsewhere that, when executed by the CPU 1105, perform various procedures, operations, or processes consistent with the processes described here. For example, memory 1110 may include a continuous integration testing program that executes a series of tests, a revision control program that accepts and installs changesets, and a web-based software platform that links various programs and allows them to use a common repository, provides a common user interface, performs basic tasks, and provides user guidance. The memory 1110 may also include other programs that perform other functions and processes, such as programs that provide communication support, Internet access, etc.

Methods, systems, and articles of manufacture described here are not limited to separate programs or computers configured to perform dedicated tasks. For example, the memory 1110 may be configured with a program 1115 that performs several functions when executed by CPU 1105, For example, the memory 1110 may include a single program 1115 that performs the functions of a revision control system and a continuous integration system. Moreover, the CPU 1105 may execute one or more programs located remotely from system 1100. For example, the system 1100 may access one or more remote programs that, when executed, perform functions related to embodiments described here.

The memory 1110 may be also be configured with an operating system (not shown) that performs several functions when executed by CPU 1105. The choice of operating system, and even to the use of an operating system, is not critical.

I/O device(s) 1125 may include one or more input/output devices that allow data to be received and/or transmitted by system 1100. For example, the I/O device 1125 may include one or more input devices, such as a keyboard, touch screen, mouse, etc., that enable data to be input from a user, such as security preferences, notes about changesets, developer credentials, etc. Further, the I/O device 1125 may include one or more output devices, such as a display screen, CRT monitor, LCD monitor, plasma display, printer, speaker devices, and the like, that enable data to be output or presented to a user. The I/O device 1125 may also include one or more digital and/or analog communication input/output devices that allow computing system 1100 to communicate with other machines and devices, such as other continuous integration systems or other revision control systems. The system 1100 may input data from external machines and devices and output data to external machines and devices via I/O device 1125. The configuration and number of input and/or output devices incorporated in the I/O device 1125 are not critical.

The system 1100 may also be communicatively connected to a database 1130. The database 1130 may comprise one or more databases that store information and are accessed and/or managed through the system 1100. By way of example, database 1130 may be a repository of a GIT system or other source code management system. The database 1130 may include, for example, directories, revision tracking information and history, source code, changesets, branches, compressed files, etc. Systems and methods described here, however, are not limited to separate databases or even to the use of a database.

The systems and techniques described here can be implemented in a computing system that includes a back end component (e.g., as a data server), or that includes a middleware component e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other embodiments are within the scope of the following claims.

What is claimed is:

1. A method for automatically enforcing a hybrid branching strategy, the method comprising:
   receiving, using at least one microprocessor of a computing device, a changeset from a source branch designated for a merge branch;
   in response to receiving the changeset, automatically determining whether a head conflict exists, the head conflict existing when the source branch lacks a latest changeset for the merge branch or lacks a latest changeset for a protected branch associated with the merge branch;
   upon determining that no head conflict exists, pushing the changeset to the merge branch and automatically initiating execution of a continuous integration testing pipeline, the continuous integration testing pipeline including a series of tests applied to the changeset; and
   if the changeset passes the series of tests, automatically merging the changeset with the associated protected branch.

2. The method of claim 1, wherein the source branch is a feature branch or a new release branch of a revision control system and the merge branch is created automatically when the source branch is created.

3. The method of claim 1, further comprising:
   if the changeset fails any of the series of tests, preventing merging of the changeset from the merge branch with the associated protected branch.

4. The method of claim 1, further comprising:
   automatically determining if the testing is successful based on a threshold associated with the continuous integration testing pipeline.

5. The method of claim 4, wherein the threshold is modifiable.

6. The method of claim 1, further comprising:
   upon receiving the changeset, automatically preventing the changeset from being pushed directly to the merge branch until it is determined that no head conflict exists.

7. The method of claim 1, further comprising:
   automatically providing feedback to a developer during the execution of the continuous integration testing pipeline, wherein the feedback includes results of one or more of the series of tests.

8. The method of claim 1, further comprising:
   automatically providing feedback to a developer after the execution of the continuous integration testing pipeline.

9. The method of claim 1, wherein each branch has an associated ordered list of changesets and the latest changeset is a most recently added changeset.

10. A revision control system comprising:
    a memory storing executable instructions; and
    a microprocessor operably coupled to the memory and configured to execute the executable instructions to:
      receive a changeset designated for a branch, wherein the branch is one of a feature branch, a personal branch, or a release branch of the revision control system;
      in response to receiving the changeset, automatically prevent the changeset from being pushed directly to a protected branch associated with the branch, and automatically push the changeset to the branch;
      automatically detect whether a head conflict associated with the changeset exists, the head conflict existing when the branch lacks a latest changeset for a merge branch associated with the branch or when the branch lacks a latest changeset for the protected branch;
      if no conflict is detected, automatically initiate execution of a continuous integration testing pipeline, the continuous integration testing pipeline including a series of tests applied to the changeset; and
      if the changeset passes the series of tests, automatically merge the changeset with the associated protected branch.

11. The system of claim 10, wherein the microprocessor is further configured to execute the executable instructions to:
    in response to receiving the changeset, check for a compatibility issue between the branch and the associated protected branch.

12. The system of claim 10, wherein the microprocessor is further configured to execute the executable instructions to:
    prevent merging of the changeset with the associated protected branch if the changeset fails any of the series of tests.

13. The system of claim 10, wherein the microprocessor is further configured to execute the executable instructions to:
    automatically determine if the testing is successful based on a threshold associated with the continuous integration testing pipeline.

14. The system of claim 10, wherein the protected branch is a master branch of the revision control system.

15. The system of claim 10, wherein the changeset includes a set of new modifications not previously stored in a repository of the revision control system.

16. The system of claim 10, wherein the microprocessor is further configured to execute the executable instructions to:

automatically provide feedback to a developer during the execution of the continuous integration testing pipeline, wherein the feedback includes results of one or more of the series of tests.

17. The system of claim 10, wherein the microprocessor is further configured to execute the executable instructions to:
automatically provide feedback to a developer after the execution of the continuous integration testing pipeline.

18. The system of claim 10, wherein the changeset includes at least one of a set of source code or a configuration file.

19. A non-transitory computer readable storage medium containing instructions that when executed by a system, cause the system to:
receive a changeset designated for a branch, wherein the branch is one of a feature branch or a release branch of the system;
in response to receiving the changeset, automatically prevent the changeset from being pushed directly to a protected branch, and automatically push the changeset to the branch;
automatically determine whether a merge conflict associated with the changeset exists between the branch and an associated protected branch;
upon determining that no merge conflict exists and that the branch contains all latest changesets from the protected branch, automatically initiate execution of a continuous integration testing pipeline, the continuous integration testing pipeline including a series of tests applied to the changeset;
automatically determine that the testing is successful when the series of tests exceeds a threshold associated with the continuous integration testing pipeline; and
upon determining that the testing is successful, automatically merge the changeset with the associated protected branch.

20. The non-transitory computer readable medium of claim 19, wherein the instructions further cause the system to:
automatically prevent merging of the changeset with the associated protected branch if the changeset fails any of the series of tests.

\* \* \* \* \*

UNITED STATES PATENT AND TRADEMARK OFFICE
CERTIFICATE OF CORRECTION

| | | |
|---|---|---|
| PATENT NO. | : 9,092,224 B2 | Page 1 of 1 |
| APPLICATION NO. | : 13/894190 | |
| DATED | : July 28, 2015 | |
| INVENTOR(S) | : Nicholas Bartlow et al. | |

It is certified that error appears in the above-identified patent and that said Letters Patent is hereby corrected as shown below:

On the title page, item (71), in "Applicant", in column 1, line 1, delete "Nobilis," and insert --Noblis,--, therefor.

Signed and Sealed this
Twenty-second Day of December, 2015

Michelle K. Lee
*Director of the United States Patent and Trademark Office*